(12) United States Patent
Benz

(10) Patent No.: US 8,240,236 B2
(45) Date of Patent: Aug. 14, 2012

(54) SAW GUIDE FOR A SAW BAND OR A SAW BLADE OF A SAWING MACHINE

(75) Inventor: Wolfgang-Gottfried Benz, Berghaupten (DE)

(73) Assignee: KEURO Besitz GmbH & Co. EDV-Dienstleistungs KG, Achern (DE)

( * ) Notice: Subject to any disclaimer, the term of this patent is extended or adjusted under 35 U.S.C. 154(b) by 333 days.

(21) Appl. No.: 12/548,525

(22) Filed: Aug. 27, 2009

(65) Prior Publication Data

US 2010/0050847 A1 Mar. 4, 2010

(30) Foreign Application Priority Data

Aug. 28, 2008 (DE) .................. 10 2008 044 669

(51) Int. Cl.
*B23D 55/08* (2006.01)
*B27B 13/10* (2006.01)
*B27B 13/12* (2006.01)

(52) U.S. Cl. ................ 83/169; 83/171; 83/820

(58) Field of Classification Search ............ 83/820, 83/98, 168–171
See application file for complete search history.

(56) References Cited

U.S. PATENT DOCUMENTS

| | | | | |
|---|---|---|---|---|
| 2,741,281 A | * | 4/1956 | Braun | 83/168 |
| 2,807,294 A | * | 9/1957 | Brown | 83/168 |
| 3,104,575 A | * | 9/1963 | Robinson | 83/168 |
| 3,452,734 A | * | 7/1969 | Cleland et al. | 125/21 |
| 3,479,097 A | * | 11/1969 | McLauchlan et al. | 384/12 |
| 3,557,848 A | * | 1/1971 | Wright | 83/169 |
| 3,593,763 A | * | 7/1971 | Neild | 83/169 |
| 3,623,520 A | * | 11/1971 | Neild | 83/169 |
| 4,222,295 A | * | 9/1980 | Sawamura | 83/169 |
| 4,635,513 A | * | 1/1987 | McGeehee | 83/169 |
| 5,159,866 A | * | 11/1992 | Dunham | 83/169 |

FOREIGN PATENT DOCUMENTS

DE 10043012 * 5/2001
FR 266536 * 3/1992

* cited by examiner

Primary Examiner — Laura M. Lee
(74) Attorney, Agent, or Firm — Volpe and Koenig, P.C.

(57) ABSTRACT

A guide for a saw band or blade of a sawing machine is provided. The guide includes a bracket and high-strength sliders, which are mounted to a bracket for a lateral guide of the saw band or saw blade and which serve for gliding contact to a side face of the saw band or blade. The sliders are high-strength guide plates, provided with an edge upstream in reference to the direction of motion of the saw blade or saw band, which is at least partially arranged in a straight manner or with a constant curve, with the edge or its tangents extending tilted at an angle from approximately 0° to 90°, preferably from 20° to 70°, in reference to the direction of motion of the saw blade or the saw band. Furthermore, several guide plates are mounted to the bracket at a distance from each other, forming clear spaces.

9 Claims, 7 Drawing Sheets

SAW GUIDE FOR A SAW BAND OR A SAW BLADE OF A SAWING MACHINE

BACKGROUND

The invention relates to a guide for a saw band or a saw blade of a sawing machine. Accordingly said guide comprises a bracket and high-strength sliders, mounted at the bracket for the lateral guide of the saw band or saw blade and for an at least temporarily contacting at a lateral area of a saw band or a saw blade in a sliding fashion.

It is common in circular sawing machines to guide the two lateral areas of the saw blade via a front and rear saw blade guide in the proximity of the saw teeth in order to suppress or at least reduce any diagonal misalignment of the saw blade, which is to be feared particularly with increasing wear of the saw blade, as well as oscillating motions of the saw blade, in particular axial oscillations. Such saw blade guides are provided with high-strength coatings, particularly carbide coatings, in order to allow ensuring a low-wear gliding contact to the saw blade. Saw blade guides of this type are disclosed in EP 1 466 688 A1, for example.

In band sawing machines it is also common to mount band guides of the type mentioned at the outset as close as possible to the work piece to be sawed in order to suppress or minimize any distortion of the saw band as well as oscillations thereof. In particular, when the saw band runs around drive or deflection rollers in a level extending tilted in reference to the cutting level or positioned parallel in reference to the cutting level such band guides are indispensable because the saw blade must be rotated into the cutting level prior to entering the work piece to be sawed or rotated back out of the cutting level into the running position after leaving it.

Guides for the saw band of a band sawing machine are usually embodied like pliers, with carbide sliders ensuring a lateral band guide at both sides of said band, while the back of the saw band is guided either via rollers or also via carbide sliders. An example of a respective band guide is disclosed in DE 198 28 589 A1.

Lateral band guides have previously been equipped with narrow carbide bars, aligned in the direction of motion of the saw band, namely preferably with a bar in the area of the saw teeth and a bar in the area of the back of the band such that a stabile lateral guide of the saw band has been ensured. The embodiment of high-strength sliders as bars aligned in the direction of motion of the saw band particularly prevents any shavings that collect at the band guide from accumulating here, which could considerably compromise the function of the band guide.

When increasing the cutting performance of a band sawing machine the applicant has now recognized that particularly the band guides need to be improved; the saw band tries to avoid any increased cutting pressure by way of a lateral tilting away such that particularly the lateral band guides are impinged with increased stress. This realization can also be applied to circular sawing machines, in principle.

SUMMARY

The present invention is therefore based on the object to improve a guide for a saw band or a saw blade of a sawing machine, of the type mentioned at the outset, to yield higher productivity of the sawing machine.

This object is attained in a guide according to the invention. Preferred further embodiments of the guide according to the invention are described below.

According to the invention it has been recognized that the guide of a saw band or a saw blade is one of the primary reasons for a rapid wear of the saw band or saw blade. This is particularly the case in a band sawing machine when the cutting productivity is considerably increased in reference to the status quo (with the saw band typically moving at 50-140 m/min). As a result of the increased cutting pressure and the increased speed of the saw band or saw blade, on the one hand, the area pressure increases between the high-strength sliders of the guide and the saw band or saw blade as well as, on the other hand, the relative speed of these parts periodically gliding over each other. Both effects lead to an increased development of heat caused by strongly increased friction.

The local heat stress of the saw band increases by the bar-like embodiment of the high-strength sliders of band guides of prior art, which have been considered indispensable due to the risk of clogging by shavings, because only very narrow sections of the area of the saw band come into a gliding contact with the high-strength sliders of the band guide. According to the invention it has been recognized that the heat stress of the saw band at areas that contact the high-strength sliders of the band guide can become so high that martensitic curing of the band material occurs and said band brittles accordingly. As a result, hairline cracks can form, ultimately resulting in the band breaking.

The present invention overcomes this problem essentially in that several high-strength, planar guiding plates are used as sliders, which are arranged tilted in reference to the direction of motion of the saw band or saw blade and at a distance from each other, forming clear spaces. Such an embodiment or arrangement of high-strength sliders reduce the planar stress upon the saw band or saw blade. When the guide plates are arranged in a plane aligned perpendicular in reference to the direction of motion of the saw band or saw blade additionally the stress of friction heat is dissipated over a larger area of the saw band or saw blade. Both effects lead to the heat stress on the saw band or saw blade being considerably reduced in reference to prior art in spite of the increase of cutting productivity and the risk of martensitic curing is eliminated. Rather, the material of the saw band or saw blade remains unaffected, considerably extending the life thereof, according to tests conducted by the applicant.

Within the scope of the present invention, eliminating the risk of material embrittlement due to excessive heat stress on the saw band or saw blade does not result in an increased risk of shavings accumulating at the guide, as generally would be expected, because of, according to an aspect of the invention, the high-strength guide plates. At least one of the guide plates, is provided with an edge upstream in reference to the direction of motion of the saw band or saw blade, which is embodied straight, at least partially, or is provided with a constant curve, with the edge, or in case of curved edges their tangents, extend tilted in reference to the direction of motion of the saw blade or saw band at an angle ranging from approximately 0° to approximately 90°, preferably from 20° to 70°. Such a diagonal positioning of an upstream edge of at least one of the guide plates leads to the effect that shavings potentially adhering to the saw blade or the saw band cannot accumulate at said edge, rather they are laterally deflected and ultimately discharged due to a vectorial summation of the forces acting upon the shavings at the diagonally positioned edge of the guide plates; thus they cannot accumulate and cause malfunctions at such a guide arranged according to the invention at guiding plates embodied in a planar fashion.

When the upstream edges of several guide plates essentially extend in a parallel fashion spaces are formed, allowing shavings accumulated therein to fall out. The combination of spaces between the guide plates and a diagonal alignment of their upstream edges considerably enhances said effect to the extent that any potentially collected shavings are discharged immediately. Accordingly, these spaces should be of a depth larger than the extension of the shavings.

It is particularly preferred to select the tilting of the upstream edges according to the invention such that any shavings potentially collected in the spaces or other generic chips accumulating at said edge can be guided downwards and/or towards the outside to the saw teeth of the saw band or the saw blade. The tilting of the upstream edges of the high-strength guide plates should therefore be aligned according to this preferred embodiment of the invention such that the saw band or saw blade first reaches the guide plates at an area of their edges furthest away from the saw teeth. The shavings are then moved by the vectorial addition of the forces applied upon any potentially present shavings by the saw band or saw blade, moving away underneath the guiding plate, along the tilted edge towards the saw teeth and discharged here.

A particularly preferred further embodiment of the present invention comprises that the fastening of the guide can be provided with openings mouthing in or next to the high-strength guide plates for introducing coolants between the bracket and the saw blade or saw band. The coolant reduces the friction between the high-strength guide plates and the saw band or saw blade, cooling the saw band or saw blade, flushes out shavings, and additionally dampens any potential oscillations, at least when coolant is introduced into the guide in an amount causing the saw band or saw blade to "float" on the high-strength guide plates. Reducing the friction by introducing coolant also considerably reduces the development of heat in the saw band or saw blade, with this effect being additionally supporting by the coolant.

However, the additional effect of the coolant flushing any potentially present shavings out of the guide is particularly advantageous within the scope of the present invention because due to the fact that the high-strength guide plates are arranged at a flat angle in reference to the direction of motion of the saw band or saw blade the relative motion between the saw band or saw blade and the high-strength guide plate supports the flushing and eliminates the risk of any shavings accumulating. Minimally, the inventive idea to introduce coolant into the guide of the saw band or the saw blade solves the conflict between a desired planar embodiment of the sliders for reasons of heat development and the avoidance of accumulated shavings. For this purpose, preferably at least one opening is provided in each space between the high-strength guide plates for introducing coolant.

Another advantage of introducing coolant into the guide according to the invention to be mentioned is the fact that particularly a saw band, but also a saw blade, is moistened particularly carefully with coolant prior to coming into contact with the work piece to be sawed. In the past, coolant has been applied rather imprecisely upon the saw band or saw blade, which in case of an operating error can lead to an insufficient amount of coolant being present in the cutting channel in the work piece, which in turn increases the wear of the saw band or saw blade.

In this context, it is advantageous when the openings for introducing coolant are arranged in a lateral saw band guide according to the invention such that the coolant is partially guided to the saw teeth as well, and not only serves to reduce friction between the saw band and the high-strength guide plates but to also flush out shavings.

If the guide according to the invention is to be used at a band sawing machine there are several advantageous further developments of the invention:

It is advantageous, for example, to arrange the high-strength guide plates in a planar fashion such that they overlap the projection height of the saw band by more than 50%. Here, the heat created by friction is distributed over a larger area of the cross-section of the saw band.

Further advantages arise when a guide for a band sawing machine, of an embodiment of the invention, is also used to guide the back of the band. For this purpose, at least one additional high-strength guide plate for the back of the band is provided for guiding the back of the saw band at the bracket of the guide, or if applicable at an additional back bracket. It also offers particular advantages for guiding the back of the band when coolant is introduced in order to minimize friction between the high-strength guide plates, embodied in a planar fashion, and the back of the band; this way any mushrooming of the back of the band is counteracted, which decisively reduces the wear of the saw band.

It is particularly advantageous when the guide plate for the back of the band is combined with a guide roller rolling over the back of the band, since the guide roller is capable of applying strong forces upon the back of the band without considerably increasing the friction at the back of the band. This usually results in the disadvantage that any potential band oscillations are not dampened by such a guide roller, which may lead to noise developing and higher wear. In contrast thereto, a guide with sliders effectively dampens band oscillations such that a combination thereof with one having such a guide roller combines the advantages of both systems and eliminates their respective disadvantages.

One such guide roller for guiding the back of a saw band can preferably be provided on a rocker, possibly together with the guide plate for the back of the band. Said rocker is then provided with a force gauge to determine the force acting upon the back of the band. This way it is possible to very precisely control a band sawing machine with regard to its traverse speed and particularly to keep the cutting pressure within an optimal range even under high cutting productivity.

The guide according to the invention can finally be complemented with a guide housing when it is provided to guide a saw band of a band sawing machine, which comprises a controlled supply of coolant and is preferably provided with a force gauge detecting any force acting upon the back of the band.

BRIEF DESCRIPTION OF THE DRAWINGS

In the following, exemplary embodiments for a band guide according to the invention for a band sawing machine are described and explained in greater detail using the attached drawings. It shows.

DETAILED DESCRIPTION OF THE PREFERRED EMBODIMENTS

Figure 1:
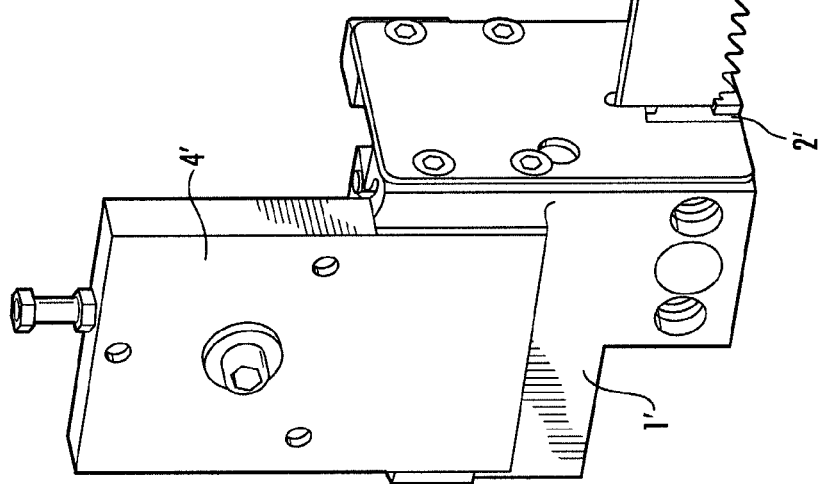
FIG. 1a schematic, perspective illustration of two band guides in guide housings for a saw band of a band sawing machine.

FIG. 1 shows two guide housings 1, 1' with band guides 2, 2', of an embodiment of the invention and installed in the guide housings 1, 1' and thus hardly visible here together with a section of a saw band 3 of a band sawing machine (not shown). The two guide housings 1, 1' are arranged at both sides of the cutting area in order to suppress or diminish any diagonal misalignment of the saw band 3 as well as oscillations thereof. Using fastening plates 4, 4', behind which a force gauge and a controllable coolant supply is located, the guide housings 1, 1' are mounted at the mobile top of the band sawing machine.

Figure 2:
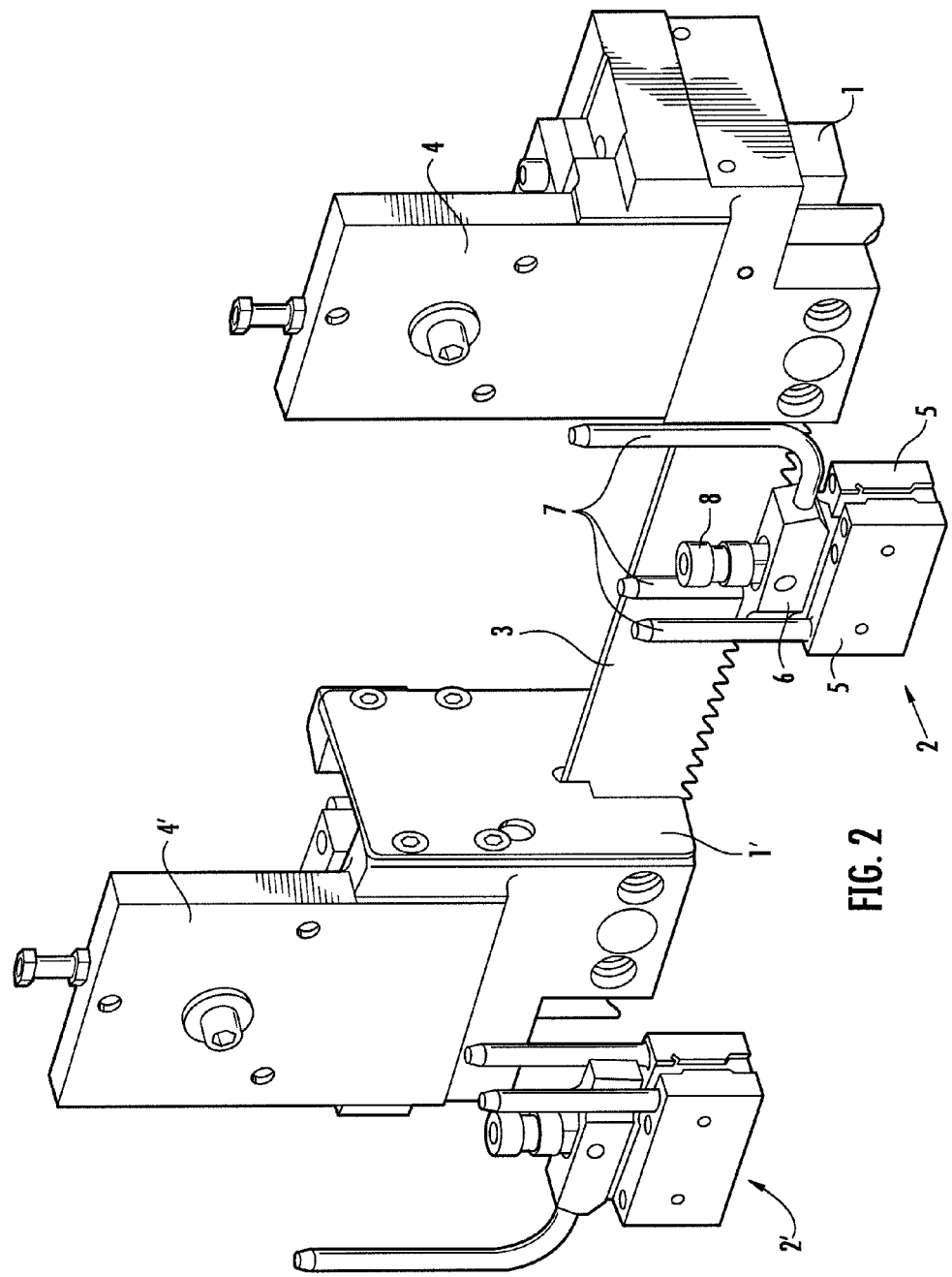
FIG. 2 an illustration similar to FIG. 1, however with the band guides disassembled from the guide housings.

FIG. 2 shows an arrangement of FIG. 1, with the two band guides 2, 2' being disassembled from their guide housings 1, 1'. As discernible, here, the band guides 2, 2' each comprise two lateral guides 5 and one guide 6 for the back of the band, with both lateral guides 5 as well as the guide 6 for the back of the band being provided with coolant supply lines 7 for introducing coolant into the band guides 2, 2'. The guide 6 for the back of the band additionally carries a force gauge 8 in order to measure the force acting upon the back of the band.

Figure 3:
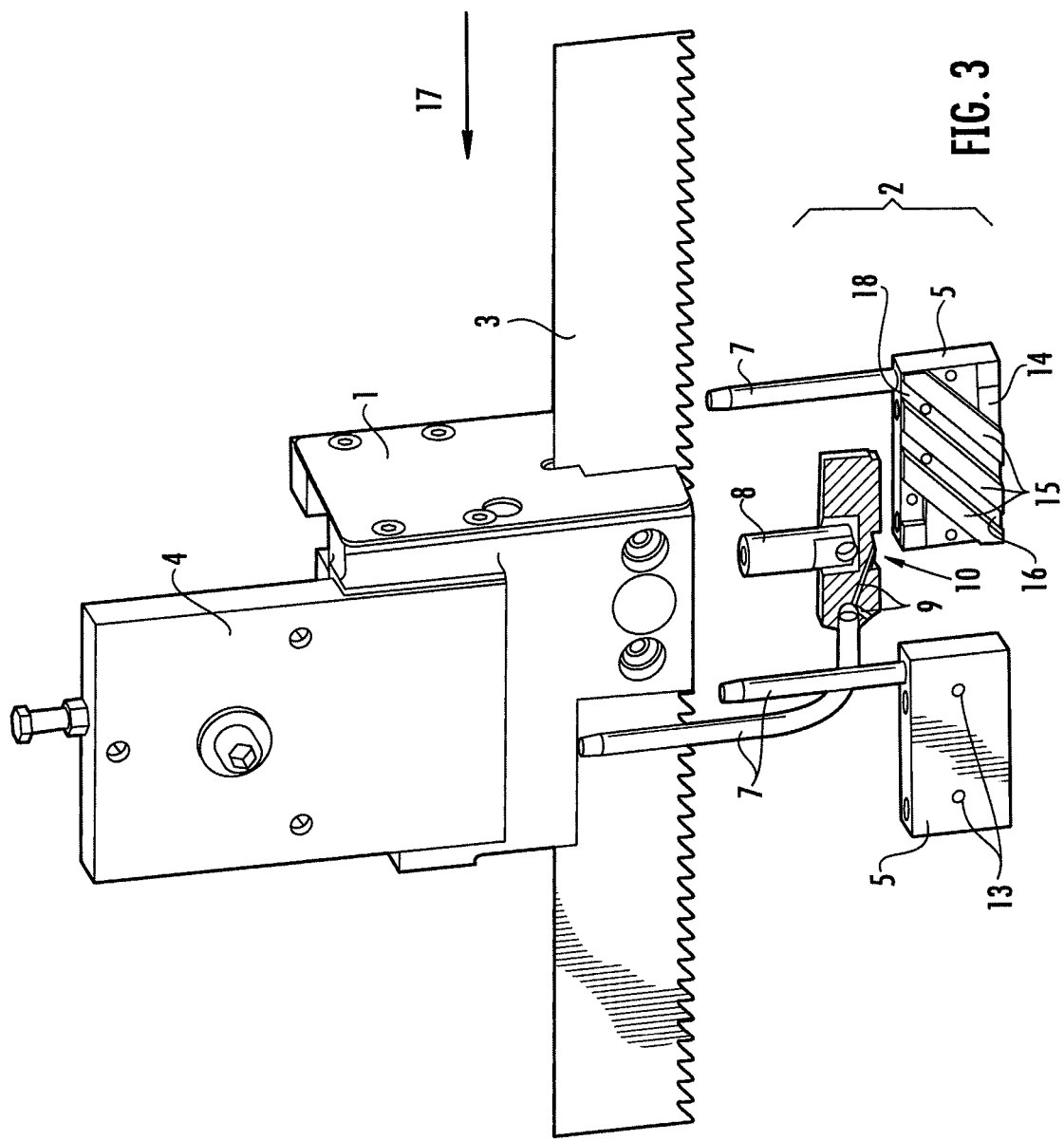
FIG. 3a disassembled band guide with the guide housing of FIG. 2 in a disassembled and partially cross-sectioned illustration.

FIG. 3 shows the band guide 2 in a disassembled state, with the guide 6 for the back of the band being shown in a partially cross-sectioned fashion, in order to illustrate its "interior operation". As clearly discernible from the guide 6 for the back of the band the coolant supply line 7 leads to two channels 9 inside the guide 6 for the back of the band. One channel 9 mouths upstream in reference to the guide 6 for the back of the band, while the other channel 9 mouths in a space 10 and ensures flushing out any potential shavings. The coolant supplied by the channels 9 considerably reduces friction between the guide 6 for the back of the band and said back of the saw band 3, with the profiling through the space 10 reducing any problems with shavings. Apart from that, the guide 6 for the back of the band comprises a back bracket 11 and two high-strength guide plates 12 for the back of the band enclosing the space 10 between each other.

FIG. 3 illustrates the lateral guides 5 in a perspective view, rendering discernible two bores 13 in the lateral guide 5 positioned at the front for mounting in the guide housing 1. The lateral guide 5 shown at the rear displays its side facing the saw band 3, thus illustrating its principle design comprising a fastening plate 14 and five planar guide plates 15 soldered thereupon. The guide plates 15 are produced from hard metal or ceramics.

The guide plates 15 are provided with upstream edges 16 extending in a straight fashion, which together with a direction of motion 17 of the saw band 3 form an angle of approximately 45°. In a projection to the height of the saw band 3 the guide plates 15 largely overlap the saw band 3, which results in an advantageously small planar compression and avoids thermal stress of a narrowly limited area of the saw band 3. Any shavings potentially accumulating at the edges 16 of the guide plates 15 are moved along the edges 16 out of the spaces 17 between the individual guide plates 15 by the motion of the saw band 3.

Figure 4:
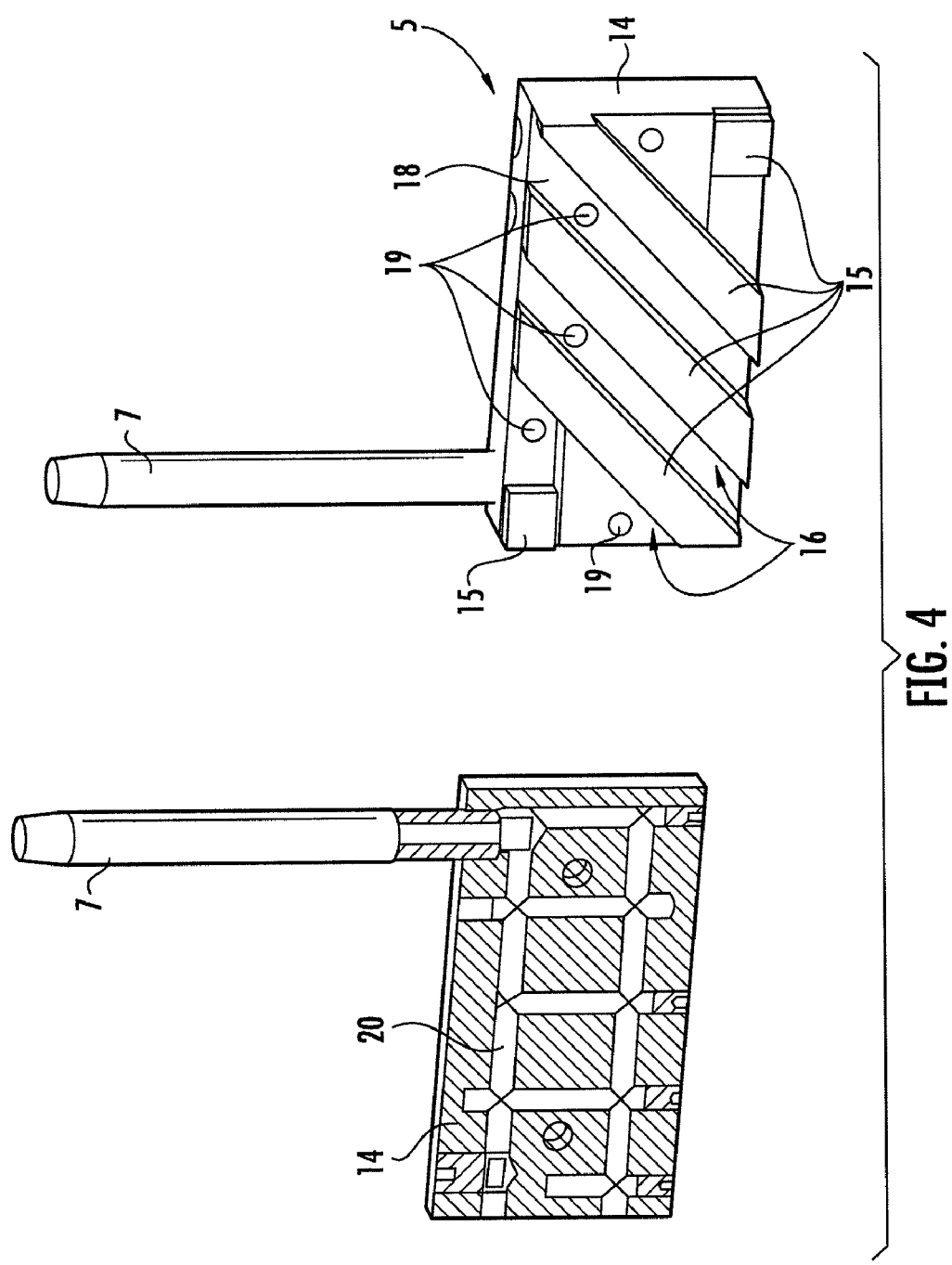
FIG. 4a partially cross-sectioned illustration of the lateral guides of the band guides of FIGS. 1 to 3.

As clearly discernible from a partially cross-sectioned illustration in FIG. 4 openings 19 are provided on the brackets 14 of the lateral guides 5 in the spaces 18 between the guide plates 15, which are connected to the coolant supply line 7 via channels 20 inserted in the bracket 14 and thus guide coolant into the spaces 18 as well as generally to the area of the guide plates 15.

Figure 5:
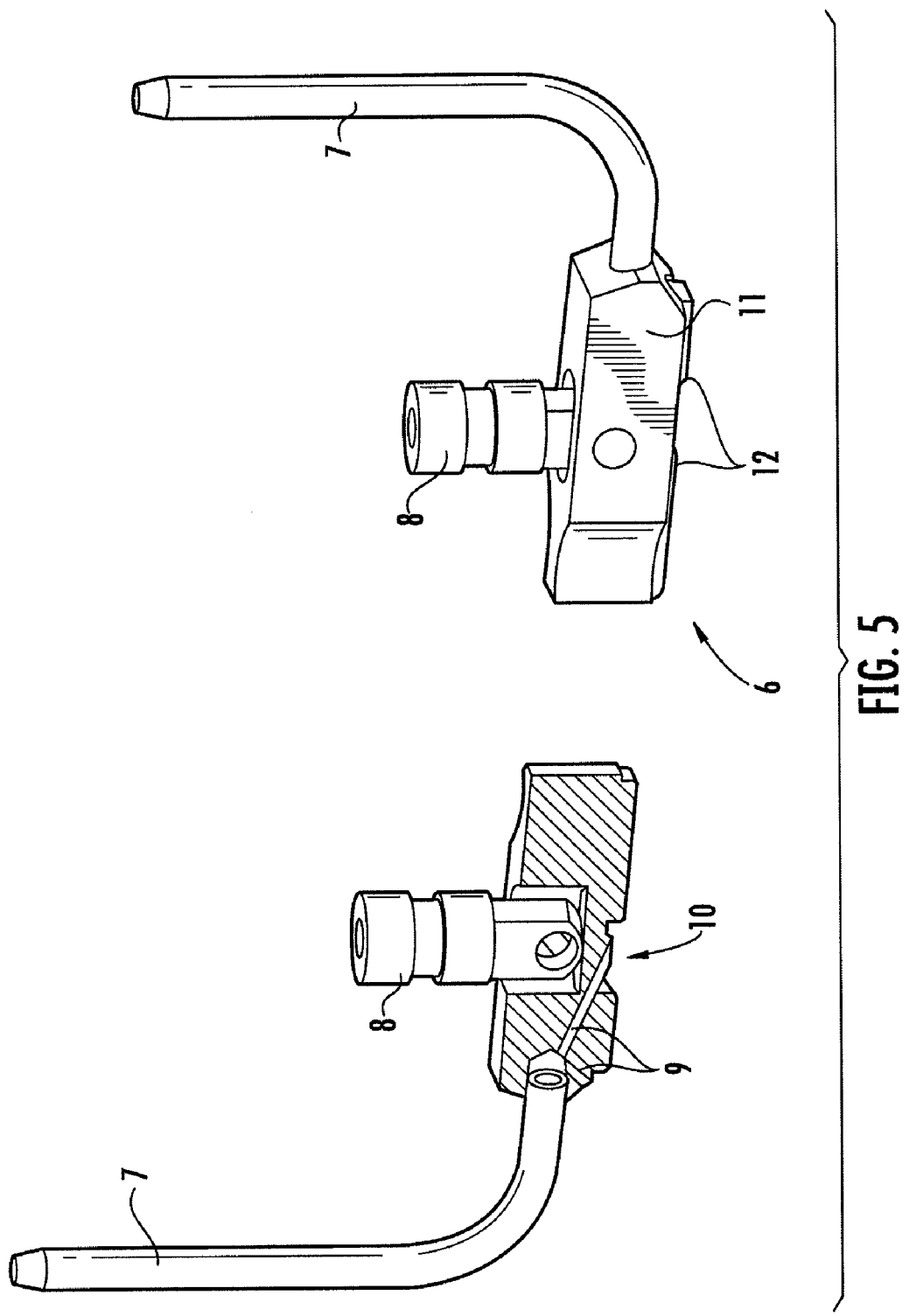
FIG. 5a partially cross-sectioned illustration of the guide of the back of the band of FIGS. 1 to 3.

FIG. 5 again shows in detail the guide 6 at the back of the band in a partially cross-sectioned view as well as in a perspective view, particularly showing that the high-strength guide plates 12 for the back of the band, also made from hard metal or ceramics, are inserted into the bracket 11 of the back and soldered.

Figure 6:
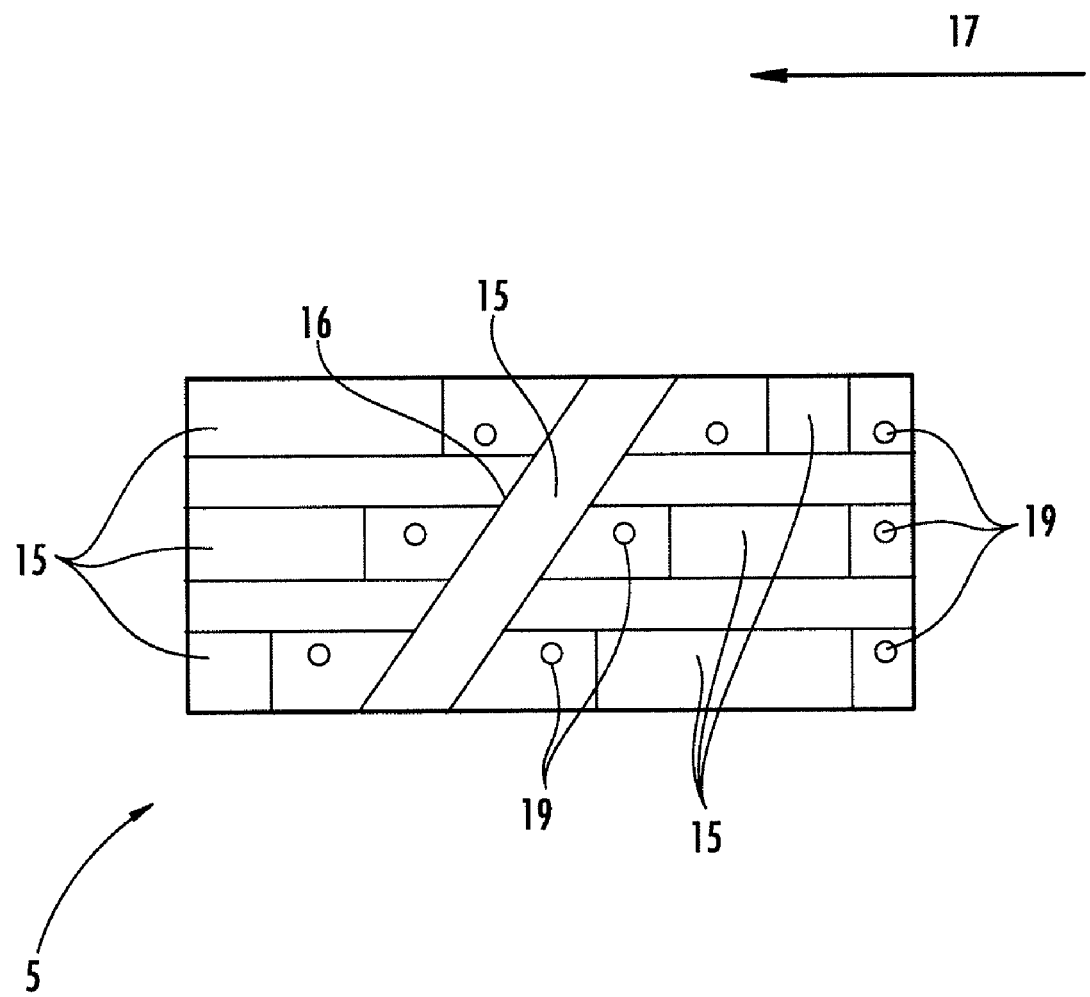
FIG. 6 another embodiment of a lateral band guide.

Finally, FIG. 6 shows another layout of the arrangement of the guide plates 15 on the bracket 14 of a lateral guide 5. Here, at least one opening 19 is provided for the discharge of coolant upstream in reference to each individual guide plate 15 so that the saw band 3 floats on all guide plates 15. The guide plate 15, arranged at an angle in the center, not only allows the lateral flushing out of shavings, supported by the motion of the saw band 3, but also guides the coolant supplied via the openings 19 towards some of the teeth of the saw band 3, in order to moisten them with coolant, usually an emulsion, prior to their contact with the work piece to be sawed.

Figure 7:
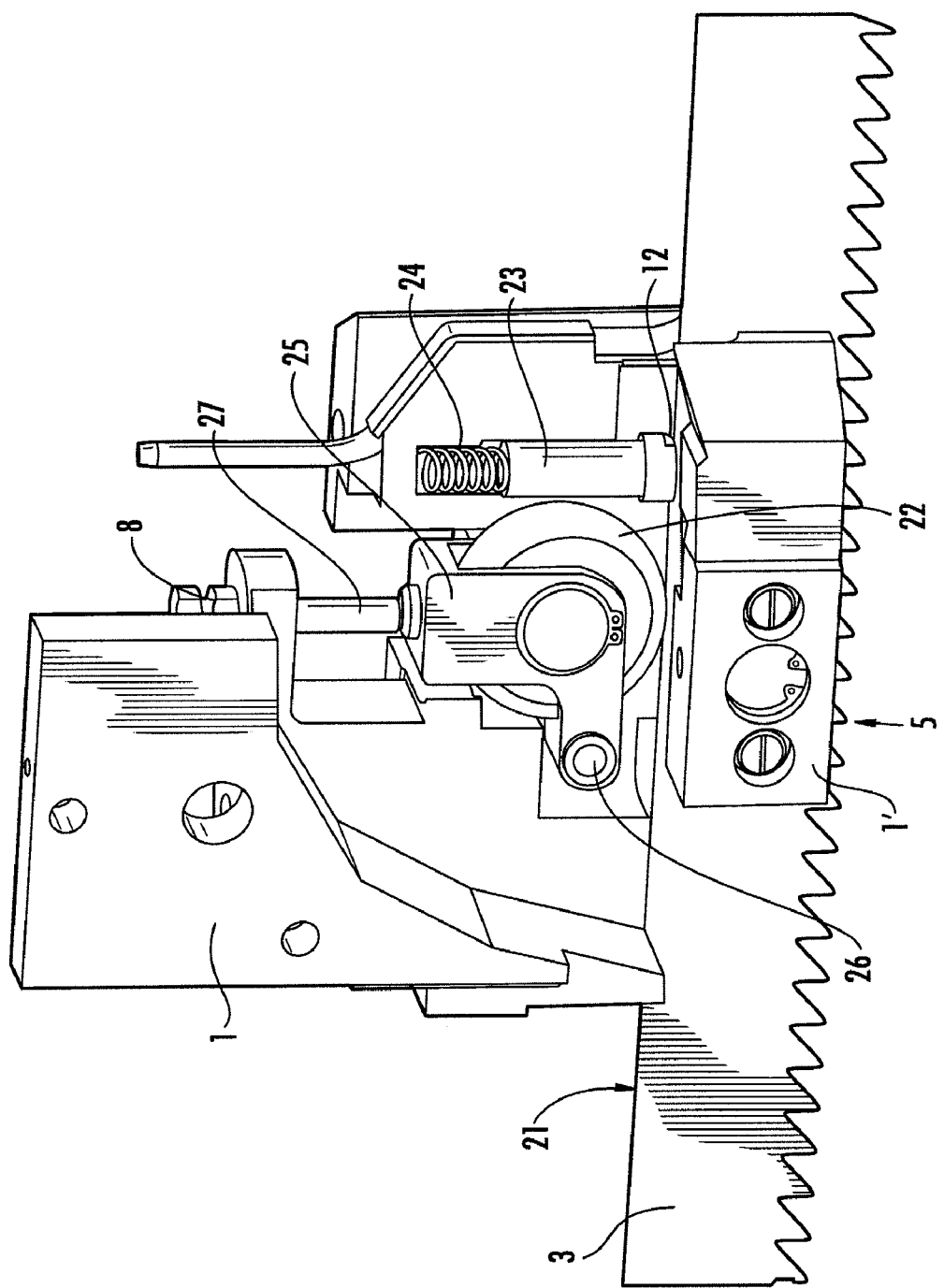
FIG. 7 another embodiment of a guide of the back of the band.

FIG. 7 displays another exemplary embodiment of the invention of a band guide in a partially cross-sectioned perspective view. The guide housing 1 is opened in the area of the guide for the back of the band in order to illustrate its specific embodiment in the present exemplary embodiment. Accordingly, the lateral guide 5 is overlapped by the area 1' of the guide housing 1 holding it. The guide of the back 21 of the saw band 3 occurs via a guide plate 12 of the back of the band as well as a guide roller 22 on which the back 21 of the band rolls. In order to ensure that the guide roller 22 compensates the majority of the cutting pressure the guide plate 12 of the back of the band is held by a slider pin 23, which in turn is placed in the guide housing 1 via a spring 24 and due to the elastic return force of the spring 24 hardly contributes to the compensation of the cutting pressure. Rather, the additional sliding guide formed by the guide plate 12 of the back of the band serves to dampen oscillations of the saw band 3. Due to the fact that the cutting pressure is essentially compensated by the guide roller 22 the saw band 3 cannot work itself into the guide plate 12 of the back of the band and form a channel in the guide plate 12 of the back of the band mushrooming the back 21 of the band, as frequently occurs in prior art.

The guide roller 22 is pivotally supported in a rocker 25, which in turn is rotationally fastened via a swivel pin 26 at the guide housing 1. A support 27 ensures that the guide roller 22 can apply the necessary forces upon the back 21 of the band, in spite of its pivotal support. Said support 27 in turn is supported on the guide housing 1 and is preferably provided with a force gauge 8, continuously measuring the cutting pressure, thereby allowing appropriate control.

While the guide roller 22 can apply very wear-resistant strong forces upon the back 21 of the saw band 3 and thus cause strong cutting pressure the additional spring-loaded gliding guide via the guide plate 12 of the back of the band ensures effective dampening of oscillations such that no increased wear can develop as a result of oscillations of the saw band 3. The combined guide of the back of the band in the exemplary embodiment shown in FIG. 7 is therefore particularly advantageous with regard to attaining the given object.

The invention claimed is:

1. A guide for a saw band or for a saw blade having two side faces of a machine saw, comprising a bracket (14) and at least three high-strength sliders (15), mounted to the bracket (14) for laterally guiding the saw band (3) or saw blade and for an at least temporary gliding contact with one of the side faces of the saw band (3) or the saw blade, wherein the sliders (15) are at least partially high-strength guide plates (15), each having an upstream edge (16) in reference to a direction of motion of the saw blade or saw band (3), which is at least partially straight or provided with a consistent curve, each of the edges (16) or its tangent extends tilted at an angle ranging from approximately 20° to approximately 70° in reference to the direction of motion (17) of the saw blade or saw band (3), and at least three of the high-strength guide plates (15) are mounted with the upstream edges parallel to one another on the bracket (14) at a distance from each other, forming at least two clear spaces (18) therebetween, wherein a tilt of the upstream edges (16) of the high-strength guide plates (15) is tilted in the direction of movement of the saw band (3) or saw blade, extending from a back edge to a toothed edge of the saw blade or saw band, and a plurality of coolant channels are located in the bracket in communication with a coolant supply line, and at least one opening (19) is provided in each of the spaces (18) between the high-strength guide plates (15) in communication with the coolant channels for introducing coolant.

2. The guide according to claim 1, wherein the at least three high-strength guide plates (15) are arranged in such a planar fashion that they overlap a projection height of the saw band (3) by more than 50%.

3. The guide according to claim 1, further comprising at least one additional high-strength guide plate (12) arranged, to guide a back (21) of the saw band (3), on the bracket (14) or on an additional bracket (11).

4. The guide according to claim 3, wherein the guide plate (12) for the back of the band is combined with a guide roller (22) on which the back (21) of the saw band rolls.

5. The guide according to claim 4, wherein at least the guide roller (22) is arranged on a rocker (25).

6. The guide according to claim 5, wherein the rocker (25) is provided with a force gauge (8) for determining a force applied upon the back (21) of the band.

7. A guide housing having a guide according to claim 1, wherein the guide is insertable into a guide housing (1), with the guide housing (1) comprising a controlled coolant supply.

8. The guide housing according to claim 7, wherein the guide housing (1) is provided with a force gauge (8) detecting a force applied upon the back of the band.

9. The guide according to claim 3, wherein the high-strength guide plates (12, 15) are made from hard metal or ceramics.

\* \* \* \* \*